United States Patent [19]

Bainard et al.

[11] 4,114,898
[45] Sep. 19, 1978

[54] OIL SEAL WITH PERMANENTLY DEFORMABLE LOCKING MEMBER

[75] Inventors: Dean R. Bainard, Bethel Township, York County, S.C.; Roger W. Wright, Kings Mountain, N.C.

[73] Assignee: Garlock Inc., Rochester, N.Y.

[21] Appl. No.: 848,291

[22] Filed: Nov. 3, 1977

Related U.S. Application Data

[63] Continuation of Ser. No. 669,669, Mar. 23, 1976, abandoned.

[51] Int. Cl.² .............................................. F16J 15/32
[52] U.S. Cl. ...................................... 277/9; 277/153; 277/179; 277/189
[58] Field of Search ................. 277/1, 9, 9.5, 10, 11, 277/35, 37, 50, 152, 153, 164, 178, 179, 189

[56] References Cited

U.S. PATENT DOCUMENTS

| | | | |
|---|---|---|---|
| 1,856,581 | 5/1932 | Mitchell | 277/9 X |
| 2,879,114 | 3/1959 | Bowen | 308/187.2 |
| 3,014,768 | 12/1961 | Dickinson | 277/179 X |
| 3,075,779 | 1/1963 | Holdham | 277/37 |
| 3,363,911 | 1/1968 | McKinven | 277/153 |
| 3,371,937 | 3/1968 | Maeda | 277/189 |
| 3,601,412 | 8/1971 | Malmstrom | 277/11 X |
| 3,741,615 | 6/1973 | Otto | 277/179 X |
| 3,913,924 | 10/1975 | Barefoot et al. | 277/37 |
| 3,989,259 | 11/1976 | Lorenz et al. | 277/179 X |
| 4,026,563 | 5/1977 | Bainard | 277/1 |

Primary Examiner—Robert S. Ward, Jr.
Attorney, Agent, or Firm—Schovee & Boston

[57] ABSTRACT

An oil seal, the combination thereof with a housing bore, and a method for installing the oil seal. This invention relates to applications where minimal radial force may be exerted against a housing bore and where the seal must be positively retained in the bore. The oil seal includes a shell having a locking member deformable radially outwardly, and an elastomeric sealing element bonded to the shell and including a face gasket for providing an O.D. seal when the locking member is deformed outwardly into an annular retaining groove in a housing bore. The seal is positively retained in the bore while exerting only minimal radial force against the bore while using less expensive cold rolled steel for the shell as contrasted to the more expensive spring steel required for snap-locking shells.

21 Claims, 4 Drawing Figures

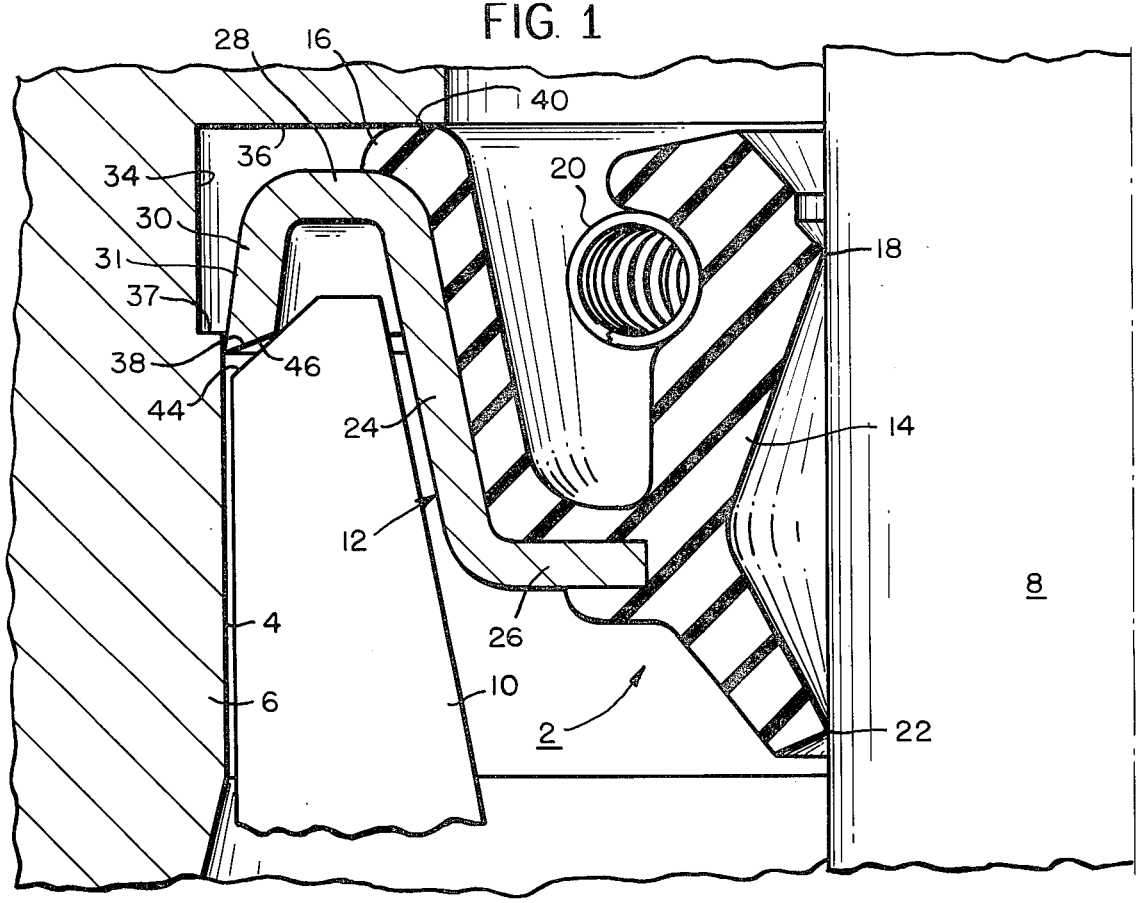
FIG. 1
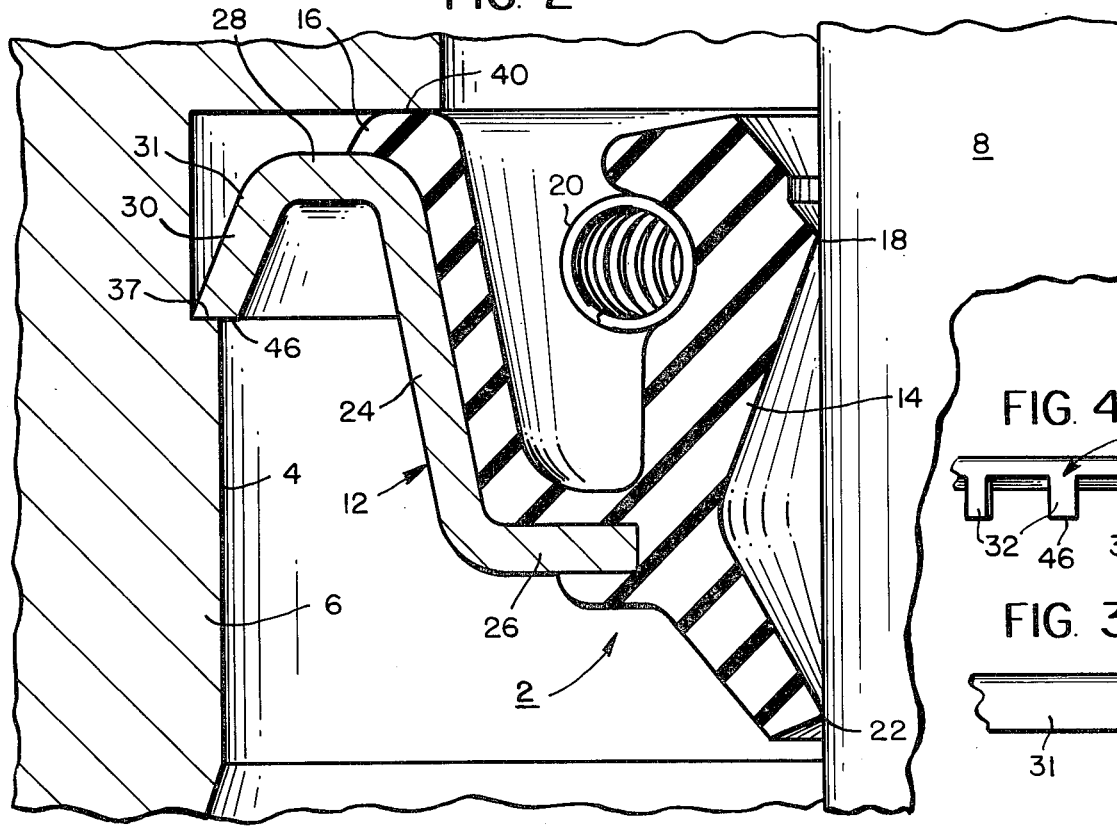
FIG. 2
FIG. 4
FIG. 3

OIL SEAL WITH PERMANENTLY DEFORMABLE LOCKING MEMBER

This is a continuation of application Ser. No. 669,669, filed Mar. 23, 1976, now abandoned.

BACKGROUND OF THE INVENTION

1. Field of the Invention

This invention relates to oil seals of the type having locking means for positively retaining the seal in a bore and for exerting only minimal radial force against the bore.

2. Description of the Prior Art

Different types of prior art seals are known having means for positively retaining the seal in a bore and for exerting only minimal radial force against the bore. However, such prior art seals are all subject to various disadvantages such as requiring the use of spring steel for the annular reinforcing shell of the oil seal for providing the flexible snap retaining means (see U.S. Pat. No. 3,075,779 for example).

It is a primary object of the present invention to provide an oil seal having locking means which exerts minimal radial force against the bore and which also positively retains the seal in the bore, and which accomplishes both of these advantages at minimum cost.

SUMMARY OF THE INVENTION

An oil seal, an apparatus including the combination of a housing and the oil seal mounted in a bore of the housing, and a method for installing an oil seal in the housing bore, wherein the oil seal includes an annular shell having an outer locking member extending axially outwardly and being deformable radially outwardly from a smaller O.D. to a larger O.D., and an elastomeric sealing element bonded to the shell and having an annular face gasket extending axially inwardly. The housing bore includes an annular undercut locking groove in the bore with a bore face at the axially inner end of the groove. The oil seal is inserted into the bore as a slip fit and an installation tool is then forced axially against the locking means compressing the gasket against the bore face until the distal end of the locking means moves past the front edge of the groove (provided with a locking shoulder) at which time further inward movement of the installation tool deforms the locking member radially outwardly into the locking groove. In this way, the oil seal is positively retained in the bore while exerting only minimal radial force against the bore. The locking means also maintains the face gasket against the bore face providing an O.D. seal for the oil seal. The locking means is preferably cold rolled steel including a plurality of separate spaced-apart fingers. The use of the cold rolled steel provides a cost advantage over the prior art use of spring steel for snap-in type locking devices.

BRIEF DESCRIPTION OF THE DRAWINGS

The present invention will be more fully understood by reference to the following detailed description thereof, when read in conjunction with the attached drawing wherein:

FIG. 1 is a partial cross-sectional view of an oil seal according to the present invention as it is being installed in a housing bore;

FIG. 2 is an identical view to FIG. 1 except that it shows the oil seal of the present invention as installed in the housing bore;

FIG. 3 is a partial elevational view of the shell of FIG. 1 showing the locking member of the present invention; and FIG. 4 is a view similar to FIG. 3 showing another embodiment of the locking member of the present invention.

DETAILED DESCRIPTION OF THE PREFERRED EMBODIMENTS

With reference now to the drawings, FIGS. 1 and 2 show an oil seal 2 according to the present invention for use between a bore 4 of a housing 6 and a shaft 8. The seal 2 is installed by means of an installation tool 10.

The oil seal 2 comprises an annular metal shell 12 and an elastomeric sealing element 14 bonded to the shell 12. The sealing element 14 includes a face gasket 16, a sealing lip 18 with a garter spring 20, as is known in the art, and a dust lip 22. The shell 12 includes a central section 24, an inner flange 26 extending radially inwardly from the axially outer end of the central section 24 (in the application shown in FIGS. 1 and 2 the vertically downward direction is the axially outer direction of the application while the vertically upward direction is the axially inner direction), an outer flange 28 extending radially outwardly from the axially inner end of the central section 24, and a locking member 30. The locking member 30 comprises a single annular ring 31 (as best shown in FIG. 3). The locking member 30 can alternatively comprise a plurality of separate spaced-apart fingers 32 as shown in FIG. 4.

The seal 2 is installed in the application as shown in FIG. 1 and 2 by inserting it as a slip fit into the bore 4 and then forcing it axially inwardly with the installation tool 10. In accordance with the present invention, the bore 4 (in this application the bore 4 is a counter-bore) is provided with an annular undercut locking groove 34 having a bore face 36 at the axially inner end thereof and a locking shoulder 37 at the axially outer end thereof. As shown in FIG. 1, the distance between the distal end 38 of the locking member 30 and the axially inner surface 40 of the face gasket 16 is a predetermined distance that is greater than the axial length of the locking groove 34. During installation, after the gasket 16 contacts the bore face 36, further movement inwardly of the installation tool causes the gasket 16 to be compressed until the distal end 38 of the locking member 30 extends inwardly beyond the locking shoulder 37 at the axially outer end of the groove 34, at which time the tool 10, by virtue of the tapered angle or chamfered surface 44 causes the ring 31 to be deformed radially outwardly into the groove 34. The locking member 30 has a locking face 46 which when in locking position, as shown in FIG. 2 is transverse to the seal axis. The face 46 in FIG. 1 is thus at an acute angle to the oil seal axis in the direction facing axially outwardly, to ensure that it will lock against the locking face 37. The material of the locking member 30 is a permanently deformable material, such as cold rolled steel, as contrasted with a flexible or resilient material such as spring steel. In this way, once the locking member 30 is deformed radially outwardly to a larger O.D. than the I.D. of the bore 4, the oil seal 2 will be positively retained in the bore since the locking member 30 cannot of its own accord move back radially inwardly to its original position. The term "permanently deformable" is defined to mean this type of non-resilient, non-flexible movement of the locking member 30. The term "locking member" is hereby defined for use in the present specification and claims to means a member that can positively retain the seal in a bore. The term "axially outward" means in the direction axially away from the fluid being sealed and "axially inward" means the direction toward the fluid. Thus, during installation, the seal 2 is moved axially inwardly.

As mentioned briefly above, FIG. 4 shows an alternative locking member in the form of a plurality of fingers 32 in place of the solid annular ring 31.

The invention has been described in detail with particular reference to the preferred embodiments thereof, but it will be understood that variations and modifications can be effected within the spirit and scope of the invention as described hereinabove and as defined in the appended claims. For example, the bore 4 need not be a counter-bore but can be of the same I.D. as the housing bore accommodating the shaft 8, although in such case the face gasket 16 would have to be positioned radially outwardly from its position shown in FIGS. 1 and 2 so that it would contact the rear face of the groove 34 to provide the O.D. seal after the locking member has been deformed into the groove 34. Further, the oil seal 2 can be of any desired shape and need not be the particular shape shown in the drawings. For example, the central section 24 can extend axially inwardly from the outer flange rather than axially outwardly. Further, the central section 24 need not be conical tapering to a smaller axially outer end as shown, but can be any desired shape as long as room is provided for the insertion of the installation tool 10. The seal can have a single or miltiple sealing lip design, which designs are well-known in the art.

What is claimed is:

1. An annular shaft seal of the type having a slip fit in a housing bore comprising:
   (a) an annular shell including means for positively retaining the seal in a bore, said retaining means including a substantially cylindrical, substantially straight, axially elongated O.D. locking member extending axially outwardly and having a free distal end terminating in an axially outwardly facing locking surface, said locking member being permanently deformable radially outwardly, after said seal has been inserted into a housing bore, from a smaller O.D. to a larger O.D. such that it can be moved radially outwardly into a locking groove of a bore to positively retain the seal in a bore; and
   (b) an elastomeric sealing element bonded to said shell and including an annular face gasket extending axially inwardly, said gasket being located axially inwardly from said locking member such that it can provide an O.D. seal for said annular shaft seal.

2. The seal according to claim 1 wherein said locking member comprises a plurality of separate fingers.

3. The seal according to claim 1 wherein said locking member comprises a solid annular ring.

4. The seal according to claim 1 wherein said shell and locking member are made of cold-rolled steel.

5. The seal according to claim 1 wherein said shell includes a central section, an inner flange extending radially inwardly from one end of said central section and an outer flange extending radially outwardly from the other end of said central section, and wherein said locking member extends axially outwardly from the radially outer end of said outer flange and wherein said gasket is bonded to the axially inner radial face of said outer flange.

6. The seal according to claim 5 wherein said locking member comprises a plurality of separate fingers.

7. The seal according to claim 6 wherein said shell and locking member are made of cold-rolled steel.

8. The seal according to claim 5 wherein said inner flange extends radially inwardly from the axially outer end of said central section and said outer flange extends radially outwardly from the axially inner end of said central section and wherein said elastomeric sealing element includes at least one sealing lip.

9. The seal according to claim 8 wherein said central section is conical, tapering to a smaller diamter axially outwardly and wherein said elastomeric sealing element includes a dust lip axially outwardly from said inner flange and wherein said sealing lip is axially inwardly from said inner flange, and wherein said elastomeric sealing element includes elastomeric material extending along the radially inner surface of said central section from said gasket to said lips.

10. An apparatus comprising:
   (a) a housing having a bore and an annular undercut locking groove in said bore with an I.D. greater than the I.D. of said bore and with a bore face at the axially inner end of said groove and a locking shoulder at the axially outer end of said groove; and
   (b) an annular shaft seal mounted with a slip fit in said bore and comprising:
      (1) an annular shell including means for positively retaining the seal in a bore, said retaining means including a substantially cylindrical, substantially straight, axially elongated O.D. locking member extending axially outwardly and having a free distal end terminating in an axially outwardly facing locking surface and being permanently deformable radially outwardly, after said seal has been inserted into a housing bore, from a smaller O.D. to a larger O.D. such that it can be moved radially outwardly into said locking groove with said locking surface abutting said locking shoulder to positively retain said seal in said bore; and
      (2) an elastomeric sealing element bonded to said shell and including an annular face gasket extending axially inwardly, said gasket being located axially inwardly from said locking member, and the distance between said distal end of said locking member and the axially inner surface of said gasket in its uncompressed state being greater than the axial length of said locking groove, said gasket being compressed such that said gasket and locking member are both located within said locking groove with said gasket providing an O.D. seal against said bore face, and said locking member being deformed radially outwardly to an O.D. larger than the I.D. of said bore and with said locking surface abutting against said shoulder and positively retaining said seal in said bore.

11. The apparatus according to claim 10 wherein said locking member comprises a plurality of separate fingers.

12. The apparatus according to claim 10 wherein said locking member comprises a solid annular ring.

13. The apparatus according to claim 10 wherein said shell and locking member are made of cold-rolled steel.

14. The apparatus according to claim 10 wherein said shell includes an outer flange extending radially outwardly and wherein said locking member extends axially outwardly from the radially outer end of said outer flange and wherein said gasket is bonded to the axially inner radial face of said outer flange.

15. The apparatus according to claim 10 wherein: said shell has a central section, an inner flange extending radially inwardly from the axially outer end of the central section, and an outer flange extending radially outwardly from the axially inner end of the central section; wherein said locking flange extends axially outwardly from the radially outer end of the outer flange; wherein said sealing element includes a sealing lip, and wherein said gasket is bonded to the axially inner radial face of said outer flange.

16. The apparatus according to claim 15 wherein said locking member comprises a plurality of separate fingers.

17. The apparatus according to claim 15 wherein said central section is conical, tapering to a smaller diameter axially outwardly and wherein said elastomeric sealing element includes a dust lip axially outwardly from said inner flange and wherein said sealing lip is axially inwardly from said inner flange, and wherein said elastomeric sealing element includes elastomeric material extending along the radially inner surface of said central section from said gasket to said lips.

18. The seal according to claim 2 wherein said fingers are spaced-apart.

19. The seal according to claim 8 wherein said fingers are spaced-apart.

20. An annular shaft seal comprising:
(a) an annular shell having an O.D. locking member extending axially outwardly and having a distal end terminating in an axially outwardly facing locking surface, said locking member being permanently deformable radially outwardly from a smaller O.D. to a larger O.D. such that it can be moved radially outwardly into a locking groove of a bore to positively retain the seal in a bore; and
(b) a sealing element connected to said shell and an annular face gasket also connected to said shell and being located axially inwardly from said locking member such that it can provide an O.D. seal for said annular shaft seal.

21. The seal according to claim 20 wherein said shell includes an outer flange extending radially outwardly and wherein said locking member extends axially outwardly from the radially outer end of said outer flange and wherein said gasket is connected to the axially inner radial face of said outer flange.

* * * * *

UNITED STATES PATENT AND TRADEMARK OFFICE
CERTIFICATE OF CORRECTION

PATENT NO. : 4,114,898
DATED : September 19, 1978
INVENTOR(S) : Dean R. Bainard and Roger W. Wright It is certified that error appears in the above-identified patent and that said Letters Patent are hereby corrected as shown below:

In Claim 9, line 2, delete "diamter" and insert therefor --diameter--.

Signed and Sealed this

Twentieth Day of March 1979

[SEAL]

Attest:

RUTH C. MASON
Attesting Officer

DONALD W. BANNER
Commissioner of Patents and Trademarks